No. 878,803. PATENTED FEB. 11, 1908.
M. B. JOLLY.
FRUIT SLICER.
APPLICATION FILED MAR. 12, 1907.
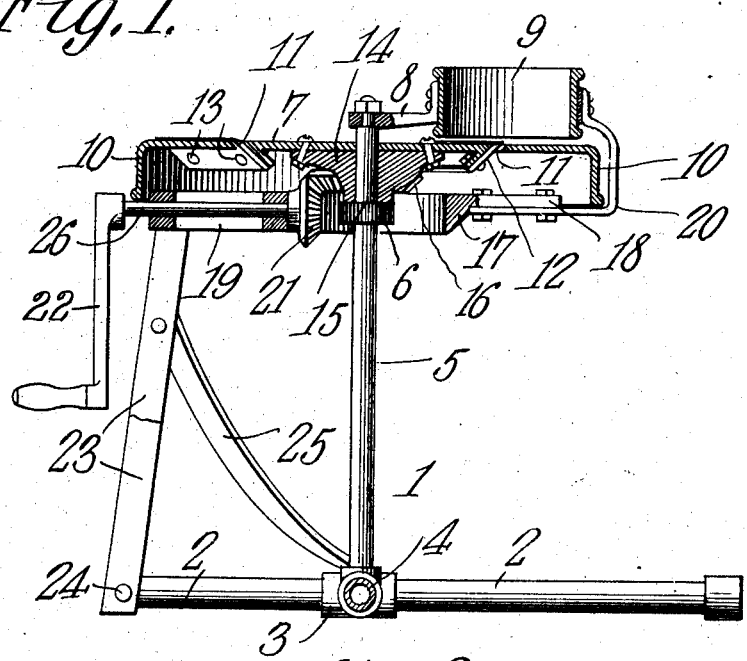
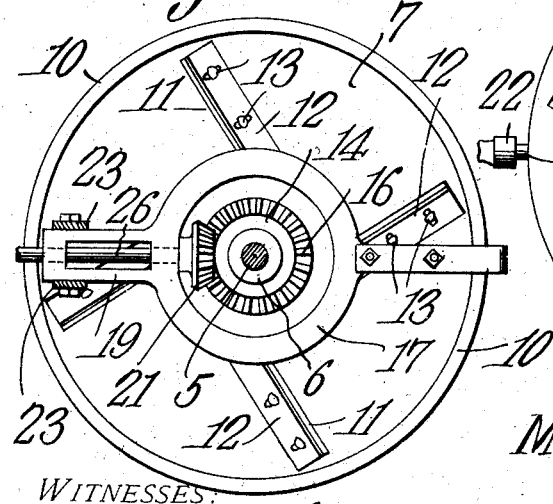
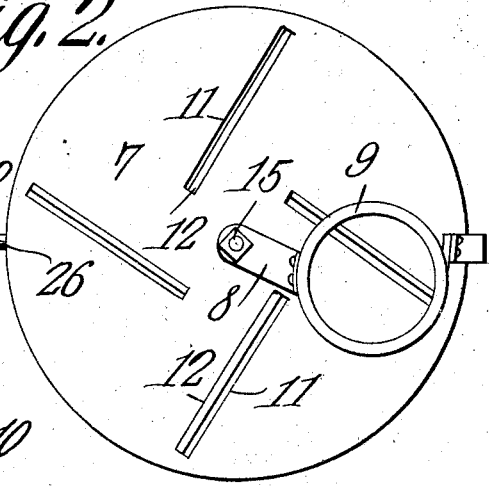
Marshall B. Jolly,
INVENTOR.
WITNESSES:
By C. A. Snow & Co.
ATTORNEYS

UNITED STATES PATENT OFFICE.

MARSHALL B. JOLLY, OF TRENTON, MISSOURI.

FRUIT-SLICER.

No. 878,803.     Specification of Letters Patent.     Patented Feb. 11, 1908.

Application filed March 12, 1907. Serial No. 361,954.

*To all whom it may concern:*

Be it known that I, MARSHALL B. JOLLY, a citizen of the United States, residing at Trenton, in the county of Grundy and State of Missouri, have invented a new and useful Fruit-Slicer, of which the following is a specification.

This invention relates to a fruit slicer, a machine by means of which fruit in quantities can be rapidly cut into slices and deposited in a suitable receptacle beneath the cutting apparatus.

The object of this invention is to provide a simple, cheap and easily transported machine for cutting into thin slices fruit or vegetables, fed into a hopper placed above a horizontally disposed rotatable table, provided with non-radial slots in which are placed knives, adapted to pass in succession below the hopper when the table is rapidly turned.

With this and other objects in view the invention consists of the novel construction, combination and arrangements hereinafter described and definitely claimed.

Referring to the accompanying drawings: Figure 1 is an elevation partly in section of the fruit slicing machine. Fig. 2 is a top plan view of the same. Fig. 3 is a bottom plan view of the table and gearing, the supporting frame being removed.

Similar numerals of reference indicate corresponding parts throughout the several figures of the drawings.

The frame 1 of the machine may be made of any suitable material and in any form desired, but in the machine shown in the drawings, the base frame is made of sections of pipe 2, connected to a union 3 and extending longitudinally while at right angles to said pipe and connected by the same means are pipes 4 these together make a cruciform base. Rising vertically from union 3 is a standard 5, extending upwardly a suitable distance and provided with a collar 6 to support a flat horizontal rotating table 7 which can turn freely on the support 5. The support 5 extends above the table 7 and has bolted thereto a bracket 8 which supports one side of a ring shaped hopper 9 open at its top and bottom, the latter being but a short distance above the surface of the table. The diameter of the hopper will be proportionate to the length of the knives and the diameter of the rotating table.

The table 7 as heretofore stated has a flat top and downwardly extending flanged edges 10, the shape of the table being preferably circular. Through the top of the table are made a plurality of non-radial slots 11 their number being optional. Within the slots are placed knives 12 with their cutting edges slightly above the top of the table, the distance being regulated by screws or bolts 13 passing through slots in the knives, which bolts also hold the knives in fixed position, as they enter threaded holes in the table 7. The length of the knives may equal the length of the slots and a larger hopper be used to contain the fruit to be sliced, or a shorter knife be employed for a consequent reduction in diameter of the hopper.

Bolted to the center of the table 7 on its under side is a casting 14 through the center of which a hole is bored for the upper end 15 of the standard 5, around which end the table rotates as a bearing. Midway of the height of the casting 14 is a bevel gear wheel 16 cast with or attached to said piece 14, power being communicated to the bevel gear for rotating the table.

The upper portion of the frame 1 comprises a circular open frame 17 from which two arms project in diametrically opposite directions, one arm 18 lying under the table below the hopper while the other arm 19 extends nearly to the periphery of the flange 10 of the rotating table. The frame piece 17 and the projecting arms 18 and 19 are substantially horizontal. Bolted to the under side of the arm 18 is a bracket 20 which curves around the rotating table 7 and is fastened to the hopper 9 opposite the bracket 8. By this means the hopper is securely held in place over the rotating table. The other arm 19 serves for a bearing for a horizontal shaft 26 carrying a bevel pinion 21 on its inner end within the frame 17 and meshing with the bevel wheel 16. The outer end of the shaft 19 is provided with a hand crank 22 by which the shaft is turned. It is apparent that in place of the crank a pulley may be substituted and the machine driven by power. To support the arm 19 a brace bar 23 extends downwardly from each side of the arm 19 to the base frame 2, to which it is attached by bolts 24. As a further means of strengthening the support, similar brace bars 25 extend from the bars 23 near their upper ends to the cross pieces 4 of the base.

The operation of the device is very simple, fruit ready for slicing is continuously fed to hopper 9 and the crank 22 turned, which, through the gearing 21 and 16, rotates the table 7 at the desired speed. The fruit or vegetable within the hopper 9 will rest on the table 7, and as it rotates the knives will cut slices from such of the fruits or vegetables as are in contact with the table. As the cutting goes on the fruit moves down in the hopper and additional fruit or vegetable fed thereto. The thickness of the slices are gaged by the height above the table of the knife edges, the slices passing down through the slots 11 into a suitable receptacle below.

Having thus described the invention what is claimed is:—

1. A fruit slicing machine comprising a fixed central vertical standard supported at its lower end by a base frame and having an upright spindle at the top of said standard, a rotatable table mounted on said spindle which projects through and above the table, a frame beneath said table supported by the base frame, means for rotating said table carried partly by said frame, a plurality of non-radial knives secured to the table and projecting upwardly through slots formed in the top of said table, a hopper disposed above one side of said table, and brackets secured to said hopper, one of which is fastened to said spindle and another to the frame below the table.

2. A slicing machine, comprising a base frame, a vertical standard rising therefrom, a fixed collar on said standard, a table rotatable on the standard and upheld by said collar, a horizontal frame below the table and supported by braces from the base frame, a driving shaft mounted in said horizontal frame and provided with a bevel gear which meshes with a similar gear wheel on said table, and a hopper above said table but in close proximity thereto supported in place by brackets connected respectively to the upper end of the standards and to the horizontal frame.

In testimony that I claim the foregoing as my own, I have hereto affixed my signature in the presence of two witnesses.

MARSHALL B. JOLLY.

Witnesses:
C. J. BAIN,
O. G. WILLIAMS.